(12) United States Patent
Lee et al.

(10) Patent No.: US 8,129,918 B2
(45) Date of Patent: *Mar. 6, 2012

(54) POWER SUPPLY, DISPLAY DEVICE, AND LIGHT SOURCE DRIVING APPARATUS

(75) Inventors: Sang-Gil Lee, Seoul (KR); Ju-Young Yoon, Suwon-si (KR); Jong-Seo Lee, Hwaseong-si (KR); Gi-Cherl Kim, Yongin-si (KR); Sang-Yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 322 days.

This patent is subject to a terminal disclaimer.

(21) Appl. No.: 12/488,403

(22) Filed: Jun. 19, 2009

(65) Prior Publication Data
US 2009/0256499 A1    Oct. 15, 2009

Related U.S. Application Data

(63) Continuation of application No. 11/197,082, filed on Aug. 4, 2005, now Pat. No. 7,567,067.

(30) Foreign Application Priority Data

Aug. 20, 2004   (KR) .................. 10-2004-0066015

(51) Int. Cl.
   *H05B 41/16* (2006.01)

(52) U.S. Cl. ........ 315/247; 315/224; 315/307; 315/291; 323/223; 323/271; 323/277; 323/282; 345/102; 345/204; 345/211

(58) Field of Classification Search .................. 323/222, 323/223, 265, 270–277, 282, 351; 345/82–84, 345/87, 98, 102, 204, 211; 315/247, 224, 315/291, 307, 312

See application file for complete search history.

(56) References Cited

U.S. PATENT DOCUMENTS

| | | | |
|---|---|---|---|
| 4,186,437 A * | 1/1980 | Cuk | .................. 363/65 |
| 5,912,552 A * | 6/1999 | Tateishi | ................ 323/285 |
| 6,294,903 B1 | 9/2001 | Yamashita et al. | |
| 6,377,032 B1 | 4/2002 | Andruzzi et al. | |
| 6,522,115 B1 | 2/2003 | Greitschus | |
| 6,696,821 B2 | 2/2004 | Haraguchi et al. | |
| 6,703,798 B2 | 3/2004 | Ohsawa | |
| 6,737,840 B2 | 5/2004 | McDonald et al. | |
| 6,853,562 B2 * | 2/2005 | Zhang | ................ 363/21.06 |
| 6,956,360 B2 | 10/2005 | Matsuura et al. | |
| 7,019,728 B2 | 3/2006 | Lee et al. | |
| 7,268,766 B2 | 9/2007 | Kim et al. | |
| 7,321,207 B2 | 1/2008 | Moon | |

(Continued)

FOREIGN PATENT DOCUMENTS

JP   07-015950   1/1995

(Continued)

*Primary Examiner* — Haiss Philogene
(74) *Attorney, Agent, or Firm* — Innovation Counsel LLP (57) ABSTRACT

A power supply is provided, which includes a DC-DC converter being supplied with an external DC input voltage and a first switching control signal and outputting a duty sensing signal of which a magnitude is varied in accordance with the first switching control signal, the duty sensing signal being indicative of a duty ratio of the first switching control signal, and the DC-DC converter converting the input voltage into a DC output voltage of a predetermined magnitude based on the first switching control signal; and a feedback controlling unit comparing the duty sensing signal with a first reference signal to adjust the duty ratio of the first switching control signal.

23 Claims, 7 Drawing Sheets

U.S. PATENT DOCUMENTS

| | | |
|---|---|---|
| 7,332,897 B2 | 2/2008 | Lee et al. |
| 7,567,067 B2 * | 7/2009 | Lee et al. ............ 323/274 |
| 2004/0008528 A1 | 1/2004 | Umemoto et al. |
| 2004/0042238 A1 | 3/2004 | Cincinelli et al. |
| 2006/0192774 A1 | 8/2006 | Yasumura |

FOREIGN PATENT DOCUMENTS

| | | |
|---|---|---|
| JP | 2001-211638 | 8/2001 |
| JP | 2002-027740 | 1/2002 |
| JP | 2002-223562 | 8/2002 |
| JP | 2003-274648 | 9/2003 |
| JP | 2004-015881 | 1/2004 |
| KR | 1998-027480 | 7/1998 |
| KR | 2000-0061712 | 10/2000 |
| KR | 2002-0071761 | 9/2002 |
| KR | 2003-0011086 | 2/2003 |

* cited by examiner

POWER SUPPLY, DISPLAY DEVICE, AND LIGHT SOURCE DRIVING APPARATUS

CROSS-REFERENCE TO RELATED APPLICATIONS

This application is a continuation of U.S. patent application Ser. No. 11/197,082 filed Aug. 4, 2005, which claims priority of Korean Patent Application No. 10-2004-0066015 filed Aug. 20, 2004, the contents of which are herein incorporated by reference in their entirety.

BACKGROUND OF THE INVENTION (a) Field of the Invention

The present invention relates to a power supply, a display device, and a light source driving apparatus.

(b) Description of the Related Art

Display devices used for monitors of computers and television sets include self-emitting displays such as light emitting diodes (LEDs), electroluminescence (EL) devices, vacuum fluorescent displays (VFDs), field emission displays (FEDs), and plasma panel displays (PDPs), and non-emitting displays such as liquid crystal displays (LCDS) requiring a light source.

An LCD includes two panels provided with field-generating electrodes and a liquid crystal (LC) layer with dielectric anisotropy interposed therebetween. The field-generating electrodes supplied with electric voltages generate an electric field in the liquid crystal layer, and the transmittance of light passing through the panels varies depending on the strength of the applied field, which can be controlled by the applied voltages. Accordingly, desired images are obtained by adjusting the applied voltages.

The light may be emitted from a light source equipped in the LCD or may be natural light.

A lighting device for an LCD, i.e., a backlight assembly, usually includes a plurality of fluorescent lamps such as external electrode fluorescent lamps (EEFLs) and cold cathode fluorescent lamps (CCFLs), and a plurality of light emitting diodes (LEDs) as light sources, which uniformly transmit the light to the entire front surface of the LC panels from the rear of the LC panels.

When using the fluorescent lamps, characteristics of elements of the display device is deteriorated due to large consumption power and heating of the fluorescent lamps.

In addition, the fluorescent lamps have a bar shape, such that they easily break on impact. Moreover, since temperatures of the lamps vary in accordance with positions thereof, making the luminance of the lamps vary, and decreasing the image quality of the LCD.

However, when using the LEDs, since each LED is a semiconductor device, the lifetime of the LED is long, the lighting speed of the LED is fast, and the power consumption is low. The LED is also resistant to impact damage and can be miniaturized more easily.

To realize the benefits, the LEDs are equipped on a monitor for middle or large sized LCDs such as for a computer or a television set, as well as on small LCDs such as in a mobile telephone for a light source.

The fluorescent lamps are activated by an AC (alternating current) voltage, but the LEDs are activated by a DC (direct current) voltage. Accordingly, for using the LEDs, the backlight assembly includes a power supply converting an AC voltage into a DC voltage and changing a magnitude of the DC voltage into a predetermined magnitude.

The power supply includes a DC-DC converter converting a magnitude of a DC voltage.

There are various types of power supply for controlling the DC-DC converter, including a voltage-controlling type, a current-controlling type, and a sensorless current-controlling type. The voltage-controlling type has advantages in a simple circuit design due to one feedback path and receives almost no influence with respect to noise. The current-controlling type turns a switching element of the DC-DC converter on or off by using a clock signal with a predetermined frequency, and has advantages in a simpler circuit design and in providing a gain bandwidth different than those of the voltage controlling type.

The sensorless current-controlling type observes an average current flowing through a switching element of the DC-DC converter by using an observer-based technique, and it turns the switching element on or off based on the average current. However, the sensorless current-controlling type can be influenced by variation of an input voltage, harmonic wave components contained in the input voltage and so on, which decreases the reliability of the DC-DC converter and a response speed thereof.

SUMMARY OF THE INVENTION

A motivation of the present invention is to solve the problems of conventional techniques.

In an embodiment of the present invention, a power supply is provided, which includes: a DC-DC converter being supplied an external DC input voltage and a first switching control signal and outputting a duty sensing signal of which a magnitude is varied in accordance with a first switching control signal, the duty sensing signal being indicative of a duty ratio of the first switching control signal, and the DC-DC converter converting the input voltage into a DC output voltage of a predetermined magnitude based on the first switching control signal; and a feedback-controlling unit comparing the duty sensing signal with a first reference signal to adjust the duty ratio of the first switching control signal.

The feedback controlling unit may include: a current sensing unit changing the duty sensing signal into a sawtooth wave signal; a duty signal adjusting unit supplied with the input voltage and a second reference signal and the duty signal adjusting unit adjusting the second reference signal based on the variation of the input voltage to generate an adjusted second reference signal as the first reference signal; a comparator comparing the sawtooth wave signal with the first reference signal to output a pulse signal of an appropriate pulse width; and a flip flop resetting a state of an output signal thereof when the pulse signal is applied, the output signal of the flip flop operative to adjust the duty ratio of the first switching control signal.

The sawtooth wave signal may have an exponential function characteristic, and the power supply may further include a linear unit decreasing the exponential function characteristic of the sawtooth wave signal to be a linear sawtooth wave signal.

The current sensing unit may include: a switching element having a control terminal supplied with a second switching control signal, an input terminal supplied with the duty sensing signal from the DC-DC converter, and an output terminal connected to a constant voltage; a resistor connected to the duty sensing signal and commonly connected to the linear unit and the constant voltage; and a capacitor connected to the input terminal and the output terminal of the switching element.

The first switching control signal may be inverse of the second switching control signal.

The duty signal adjusting unit may be a divider.

The flip flop may be an RS flip flop of which a set terminal is connected to an external clock signal, a reset terminal is connected to the comparator, a non-inverting output terminal outputs the first switching control signal, and an inverting output terminal outputs the second switching control signal.

In a further embodiment of the present invention, a display device including a plurality of pixels, a lamp unit emitting light to the pixels, and a power supply applying a driving voltage to the lamp unit is provided, wherein the power supply includes: a DC-DC converter being supplied an external DC input voltage and a first switching control signal and outputting a duty sensing signal of which a magnitude is varied in accordance with a first switching control signal, the duty sensing signal being indicative of a duty ratio of the first switching control signal, and the DC-DC converter converting the input voltage into a DC output voltage of a predetermined magnitude based on the first switching control signal; and a feedback controlling unit comparing the duty sensing signal with a first reference signal to adjust a duty ratio of the first switching control signal.

The feedback controlling unit may include: a current sensing unit changing the duty sensing signal into a sawtooth wave signal; a duty signal adjusting unit supplied with the input voltage and a second reference signal and the duty signal adjusting unit adjusting the second reference signal based on the variation of the input voltage to generate an adjusted second reference signal as the first reference signal; a comparator comparing the sawtooth wave signal with the first reference signal to output a pulse signal of an appropriate pulse width; and a duty ratio adjusting unit resetting a state of an output signal thereof when the pulse signal is applied, the output signal of the duty ratio adjusting unit operative to adjust the duty ratio of the first switching control signal.

The sawtooth wave signal may have an exponential function characteristic, and the power supply may further include a linear unit decreasing the exponential function characteristic of the sawtooth wave signal to be a linear sawtooth wave signal.

The current sensing unit may include: a switching element having a control terminal supplied with a second switching control signal, an input terminal supplied with the duty sensing signal from the DC-DC converter, and an output terminal connected to a constant voltage; a resistor connected to the duty sensing signal and commonly connected to the linear unit and the constant voltage; and a capacitor connected to the input terminal and the output terminal of the switching element.

The first switching control signal may be inverse of the second switching control signal.

The duty ratio adjusting unit may be an RS flip flop being applied an external clock signal and the pulse signal from the comparator and outputting the first switching control signal.

The lamp unit may include a light emitting diode.

In a still further embodiment of the present invention, a current controlling apparatus controlling a DC-DC converter which is applied an external DC input voltage and a first switching control signal and outputs a duty sensing signal of which a magnitude is varied in accordance with a first switching control signal, the duty sensing signal being indicative of a duty ratio of the first switching control signal, and the DC-DC converter converts the input voltage into a DC output voltage of a predetermined magnitude based on the first switching control signal is provided, which includes: a current sensing unit changing the duty sensing signal into a sawtooth wave signal; a duty signal adjusting unit supplying with the input voltage and a second reference signal and the duty signal adjusting unit adjusting the second reference signal based on the variation of the input voltage to generate an adjusted second reference signal as the first reference signal; a comparator comparing the sawtooth wave signal with the first reference signal to output a pulse signal of an appropriate pulse width; and a duty ratio adjusting unit resetting a state of an output signal thereof when the pulse signal is applied, the output signal of the duty ratio adjusting unit operative to adjust the duty ratio of the first switching control signal.

The sawtooth wave signal may have an exponential function characteristic, and the apparatus may further include a linear unit decreasing the exponential function characteristic of the sawtooth wave signal to be a linear sawtooth wave signal.

The current sensing unit may include: a switching element having a control terminal supplied with a second switching control signal, an input terminal supplied with the duty sensing signal, and an output terminal connected to a constant voltage; a resistor connected to the duty sensing signal and commonly connected to the linear unit and the constant voltage; and a capacitor connected to the input terminal and the output terminal of the switching element.

The first switching control signal may be inverse of the second switching control signal.

In a still further embodiment of the present invention, a light source driving apparatus is provided, which includes: a lamp unit having at least one light source; a power supply applying a driving voltage to the light source; and a signal controlling unit applying a lamp control signal to the light source. The power supply includes: a signal converting unit converting an externally applied AC voltage into a DC voltage; a DC-DC converter being supplied with the DC voltage and a first switching control signal and outputting a duty sensing signal of which a magnitude is varied in accordance with a first switching control signal, the duty sensing signal being indicative of a duty ratio of the first switching control signal, and the DC-DC converter converting the input voltage into a DC output voltage of a predetermined magnitude based on the first switching control signal; and a feedback controlling unit comparing the duty sensing signal with a first reference signal to adjust the duty ratio of the first switching control signal.

The feedback controlling unit may include: a current sensing unit changing the duty sensing signal into a sawtooth wave; a duty signal adjusting unit supplied with the input voltage and a second reference signal, the duty signal adjusting unit adjusting the second reference signal based on the variation of the input voltage to generate an adjusted second reference signal as the first reference signal; a comparator comparing the sawtooth wave signal with the first reference signal to output a pulse signal of an appropriate pulse width; and a duty ratio adjusting unit resetting a state of an output signal thereof when the pulse signal is applied, the output signal of the duty ratio adjusting unit operative to adjust the duty ratio of the first switching control signal.

The light source may be a light emitting diode.

BRIEF DESCRIPTION OF THE DRAWINGS

The present invention will become more apparent by describing embodiments thereof in detail with reference to the accompanying drawings, in which.

DETAILED DESCRIPTION OF EMBODIMENTS

The present invention will be described more fully hereinafter with reference to the accompanying drawings, in which preferred embodiments of the invention are shown. This invention may, however, be embodied in many different forms and should not be construed as being limited to the embodiments set forth herein.

In the drawings, the thickness of layers and regions are exaggerated for clarity. Like numerals refer to like elements throughout. It will be understood that when an element such as a layer, region, or substrate is referred to as being "on" another element, it can be directly on the other element or intervening elements may also be present. In contrast, when an element is referred to as being "directly on" another element, there are no intervening elements present.

Power supplies, backlight apparatuses, and light source driving apparatuses according to embodiments of the present invention will be described with reference to the accompanying drawings.

A liquid crystal display according to an embodiment of the present invention is described in detail with reference to FIGS. 1-4.

Figure 1:
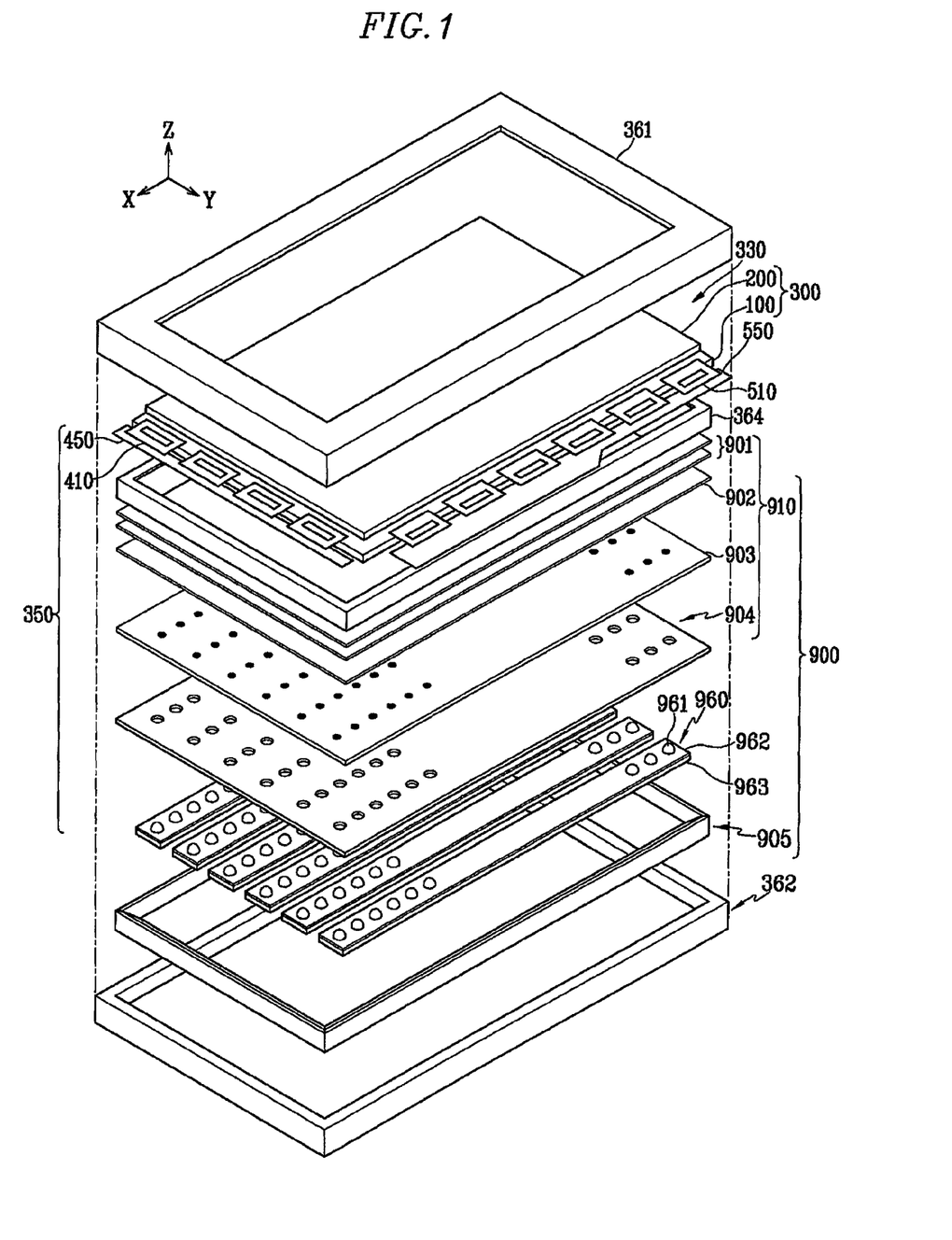
FIG. 1 is an exploded perspective view of an LCD according to an embodiment of the present invention.
Figure 2:
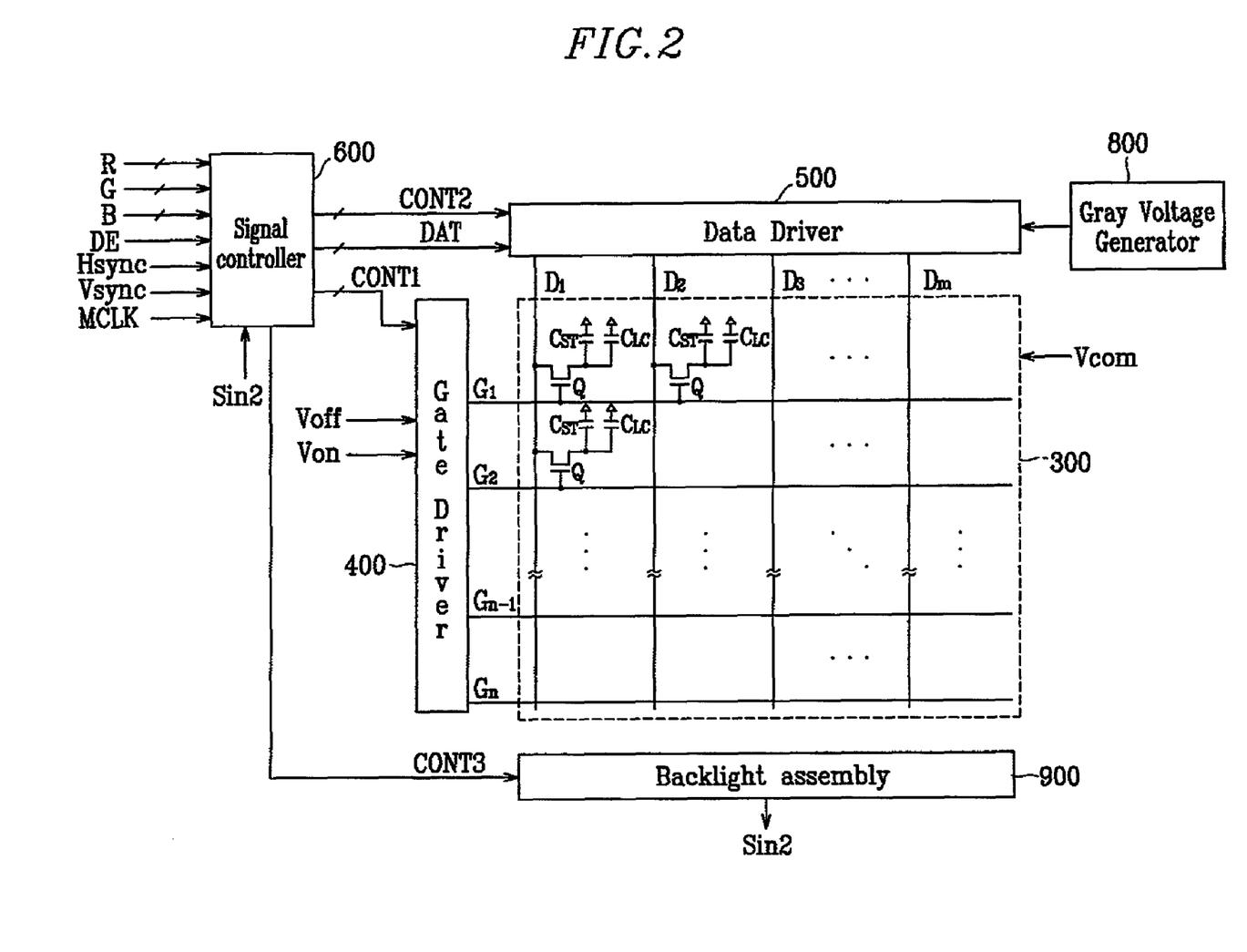
FIG. 2 is a block diagram of a part of the LCD shown in FIG. 1.
Figure 3:
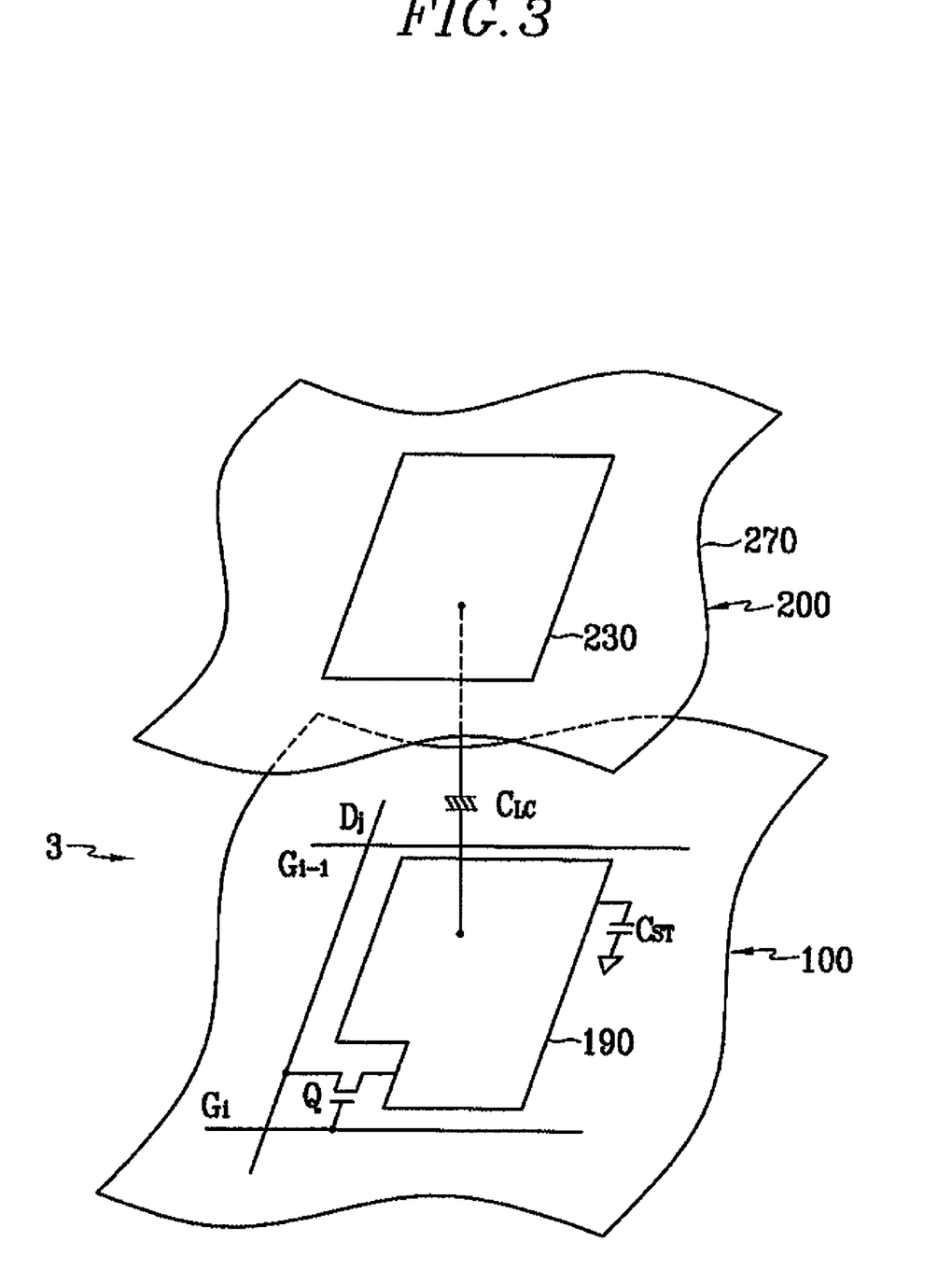
FIG. 3 is an equivalent circuit diagram of a pixel of the LCD shown in FIG. 1.
Figure 4:
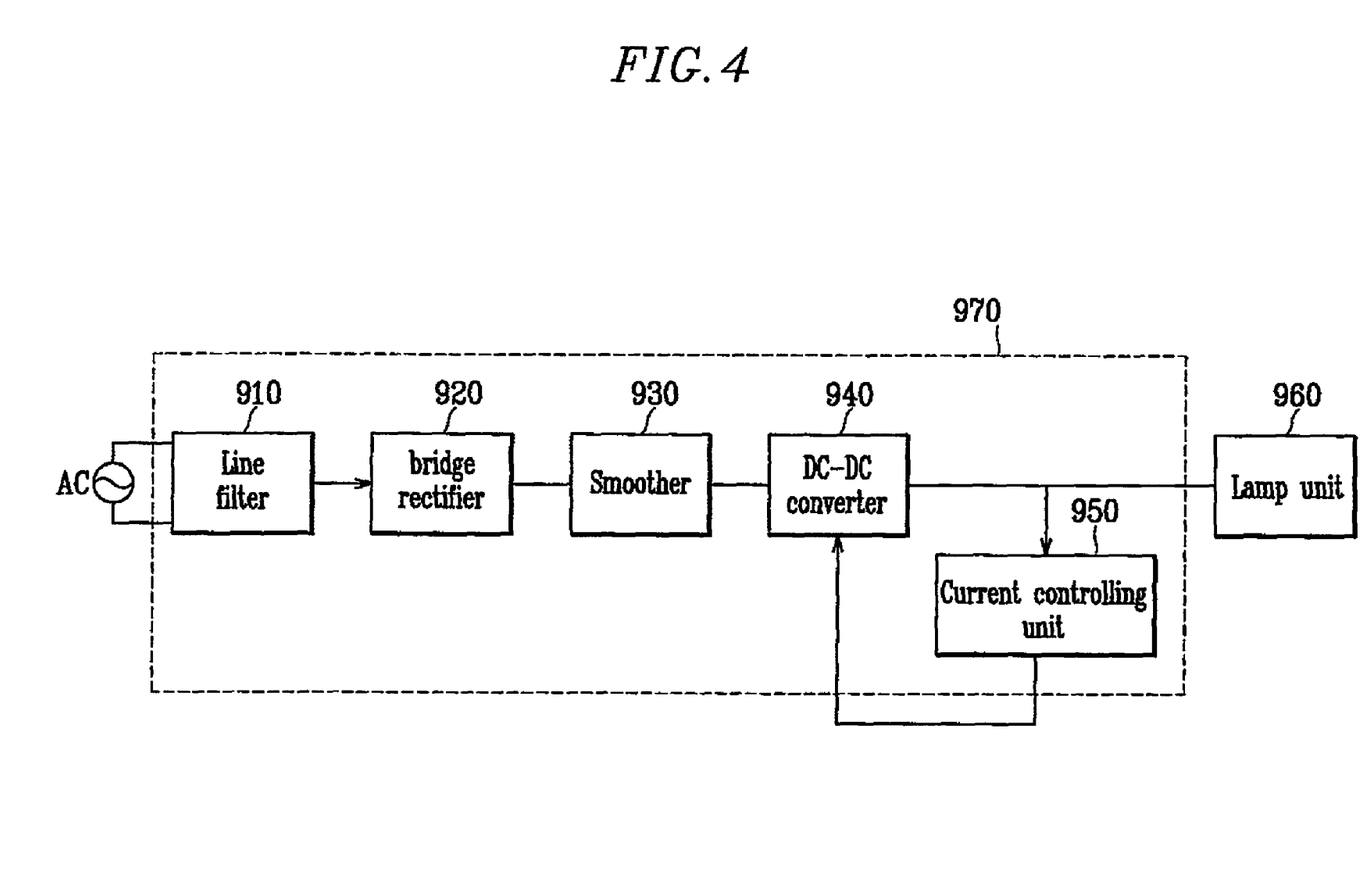
FIG. 4 is a block diagram of a backlight assembly according to an embodiment of the present invention.

FIG. 1 is an exploded perspective view of an LCD according to an embodiment of the present invention, FIG. 2 is a block diagram of a part of the LCD shown in FIG. 1, and FIG. 3 is an equivalent circuit diagram of a pixel of the LCD shown in FIG. 1. FIG. 4 is a block diagram of a backlight assembly according to an embodiment of the present invention.

Referring to FIG. 1, the LCD according to an embodiment of the present invention includes a display module 350 including a display unit 330 and a backlight assembly 900, and a pair of front and rear cases 361 and 362, and a mold frame 364.

The display unit 330 includes a display panel assembly 300, a plurality of gate tape carrier packages (TCPs) or chip-on-film (COF) type packages 410, and a plurality of data TCPs 510 attached to the display panel assembly 300, and a gate printed circuit board (PCB) 450 and a data PCB 550 attached to the gate and the data TCPs 410 and 510, respectively.

The display panel assembly 300 includes a lower panel 100, an upper panel 200, and a liquid crystal layer 3 interposed therebetween as shown in FIG. 3.

The display panel assembly 300 includes a plurality of display signal lines G1-Gn and D1-Dm, and a plurality of pixels connected thereto and arranged substantially in a matrix in a circuital view.

The display signal lines G1-Gn and D1-Dm are disposed on the lower panel 100 and include a plurality of gate lines G1-Gn transmitting gate signals (also referred to as "scanning signals"), and a plurality of data lines D1-Dm transmitting data signals. The gate lines G1-Gn extend substantially in a row direction and are substantially parallel to each other, while the data lines D1-Dm extend substantially in a column direction and are substantially parallel to each other.

Each pixel includes a switching element Q connected to the display signal lines G1-Gn and D1-Dm, and an LC capacitor $C_{LC}$ and a storage capacitor $C_{ST}$ that are connected to the switching element Q. The storage capacitor $C_{ST}$ may be omitted if it is unnecessary.

The switching element Q that may be implemented as a TFT is disposed on the lower panel 100. The switching element Q has three terminals: a control terminal connected to one of the gate lines G1-Gn; an input terminal connected to one of the data lines D1-Dm; and an output terminal connected to the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as a dielectric of the LC capacitor $C_{LC}$. The pixel electrode 190 is connected to the switching element Q, and the common electrode 270 is supplied with a common voltage Vcom and covers an entire surface of the upper panel 200. Unlike in FIG. 3, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line, which is provided on the lower panel 100, it overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of primary colors (i.e., spatial division), or each pixel sequentially represents the primary colors in turn (i.e., temporal division) such that a spatial or temporal sum of the primary colors is recognized as a desired color. An example of a set of the primary colors includes red, green, and blue colors. FIG. 3 shows an example of the spatial division in which each pixel includes a color filter 230 representing one of the primary colors in an area of the upper panel 200 facing the pixel electrode 190. Alternatively, the color filter 230 is provided on or under the pixel electrode 190 on the lower panel 100.

As shown in FIGS. 1 and 2, the gate TCPs 410 are kinds of flexible printed circuit (FPC) films and are attached to an edge of the lower panel 100 of the LC panel assembly 300. The gate TCPs 410 mounts gate integrated circuit (IC) chips forming a gate driver 400, and the data TCPs 510 mounts data IC chips forming a data driver 500. The gate driver 400 and the data driver 500 are electrically connected to the gate lines G1-Gn and the data lines D1-Dm of the panel assembly 300 through signal lines (not shown) formed on the TCPs 410 and 510, respectively.

The gate driver 400 generates gate signals including a gate-on voltage Von and a gate-off voltage Voff to for application to the gate lines G1-Gn.

The data driver 500 applies data voltages to the data lines D1-Dm.

Alternatively, the driving IC chips for the gate driver 400 and the data driver 500 may be directly mounted on the panel assembly without TCPs, which is called "chip on glass" (COG) mounting. The gate driver 400 or the data driver 500 may be formed on the LC panel assembly 300 in company with the switching elements Q, the display signal lines G1-Gn, and the data lines D1-Dm.

The gate PCB 450 is attached to the TCPs 410 in a longitudinal direction along an edge of the lower panel 100, and the data PCB 550 is attached to the TCPs 510 in a longitudinal direction along another edge of the lower panel 100.

The gate PCB 450 and the data PCB 550 mount a gray voltage generator 800 and a signal controller 600 as well as signal lines (not shown).

The gray voltage generator 800 generates two sets of gray voltages related to the transmittance of the pixels and applies gray voltages to be selected as the data voltages to the data driver 500.

The signal controller 600 controls the drivers 400 and 500, etc.

As shown in FIGS. 1, 2, and 4, the backlight assembly 900 includes a lamp unit 960 housed in the rear chassis 362 and fixed thereto and disposed on the LC panel assembly 300, a plurality of optical equipments 910 disposed between the LC panel assembly 300 and the lamp unit 960 adjusting light emitting form the lamp unit 960, and a power supply 970 applying a supply voltage to the lamp unit 960. The backlight assembly 900 also includes a supporting frame 905 housed in the rear chassis 362 to fixed the lamp unit 960. The supporting frame 905 is fixed to the mold frame 364.

The lamp unit 960 includes a plurality of PCBs 962 which mount a plurality of LEDs 961, respectively, and radiant heat members 963 attached to the PCBs 962 to dispel radiant heat. The radiant heat members 963 are preferable made of heat conduction materials. Each PCB 962 is arranged horizontally along a longitudinal axis, and mounts in turn red, green, and blue LEDs 961. The number of the green LEDs may be larger than the number of red and blue LEDs, respectively, for example, preferably by about two times. However, the number of the LEDs may be changed if necessary.

One or more polarizers (not shown) for polarizing the light from the lamp unit 960 are attached to the outer surfaces of the panels 100 and 200.

The optical equipment 910 includes a reflector 904, a light guide plate 903, a spread plate 902, and a least one optical sheet 901.

The reflector 904 is disposed between the LC assembly panel 300 and the lamp unit 960. The reflector 904 has a plurality of light emitting holes with a predetermined size which are arranged at predetermined intervals, and it reflects light not passing through the light emitting holes in a downward direction.

The light guide plate 903 is disposed over the reflector 904 and has light blocking films formed on portions facing the respective LEDs 961. The light guide plate 903 uniformly maintains the intensity of light from the LEDs 961.

The spread plate 902 guides and spreads light from the light guide plate 903 to the LC panel assembly 300.

The optical sheet 901 guarantees luminance characteristics.

In FIG. 1, each light emitting hole formed on the reflector 904 has a circular shape such that the corresponding LED is projected through the hole. It is preferable to have sizes and shapes such as a rectangular shape or a slit shape adapted to project a predetermined number of the LEDs. The internal lateral sides of the supporting frame 905 are inclined relative to an upper surface thereof, to reflect the light from the lamp unit 960 in an upward direction.

As shown in FIG. 4, the power supply 970 includes a line filter 910, a bridge rectifier 920 connected to the line filter 910, a smoother 930 connected to the bridge rectifier 920, a DC-DC converter 940 connected to the smoother 930, and a current controlling unit 950 connected to the DC-DC converter 940. At this time, the power supply 970 is supplied with an AC voltage of about 90V to 220V.

Figure 5:
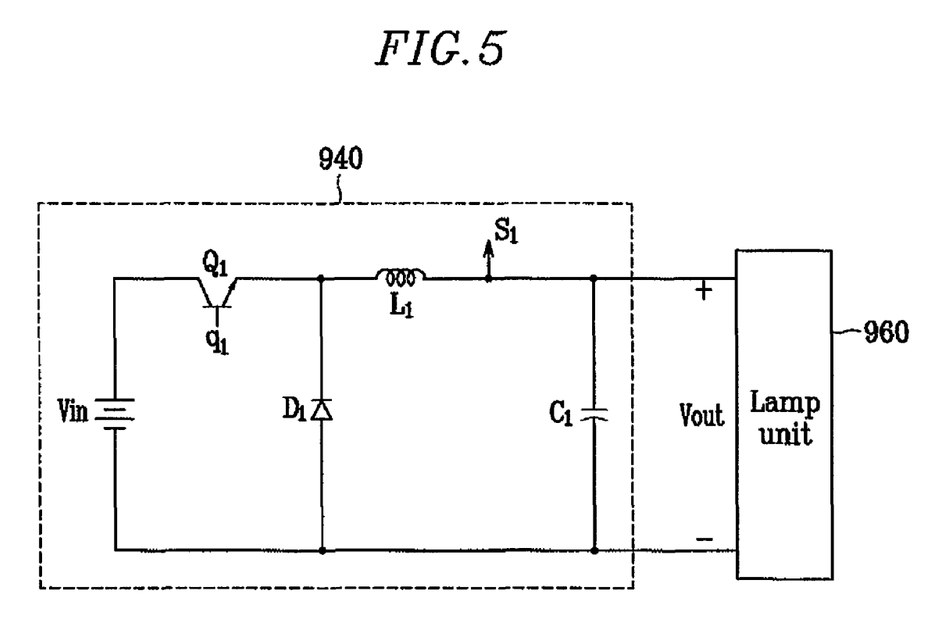
FIG. 5 is a circuit diagram of a DC-DC converter according to an embodiment of the present invention.

As shown in FIG. 5, an output voltage from the smoother 930 is applied to the DC-DC converter 940 as an input voltage Vin. The DC-DC converter 940 includes a switching element Q1 having a control terminal connected to the current controlling unit 950, a diode D1 connected between an output terminal of the switching element Q1 and the input voltage Vin in a reverse direction from the switching element Q1, an inductor L1 connected to the output terminal of the switching element Q1, and a capacitor C1 connected between the inductor L1 and the input voltage Vin. A voltage applied to both terminals of the capacitor C1 is to be an output voltage Vout which is applied to the lamp unit 960. The type of DC-DC converter may be varied.

Not shown in FIG. 1, an upper case and a lower case are disposed on the front chassis 361 and the rear chassis 362, respectively, and combine with each other to complete the LCD.

Now, the operation of the LCD will be described in detail with reference to FIGS. 1 to 4.

Referring to FIG. 1, the signal controller 600 is supplied with input image signals R, G, and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1, data control signals CONT2, and backlight control signals CONT3 and processing the image signals R, G, and B to be suitable for the operation of the panel assembly 300 on the basis of the input control signals and the input image signals R, G, and B, the signal controller 600 provides the gate control signals CONT1 for the gate driver 400, the processed image signals DAT and the data control signals CONT2 for the data driver 500, and the backlight control signals CONT3 for the backlight assembly 900.

The gate control signals CONT1 include a scanning start signal STV for instructing the gate driver 400 to start scanning, and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of pixels, a load signal LOAD for instructing the data driver 500 to apply the data voltages to the data lines $D_1$-$D_m$, and a data clock signal HCLK. The data control signal CONT2 may further include an inversion signal RVS for reversing the polarity of the data voltages (with respect to the common voltage Vcom).

The backlight control signals CONT3 include a plurality of control signals such as a clock signal controlling the current controlling unit 950, a PWM (pulse width modulation) lamp control signal controlling the LEDs 961 of the lamp unit 960, and so on.

Alternatively, the backlight control signals CONT3 are supplied from a separate controller instead of the signal controller 600.

In response to the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines $D_1$-$D_m$.

The gate driver 400 applies the gate-on voltage Von to the gate line $G_1$-$G_n$ in response to the gate control signals CONT1 from the signal controller 600, thereby turning on the switching elements Q connected thereto. The data voltages applied to the data lines $D_1$-$D_m$ are supplied to the pixels through the activated switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage.

The power supply 970 supplying driving voltages to the lamp unit 960 filters noises contained in an external AC input voltage by using the line filter 910 to apply the AC input voltage to the bridge rectifier 920. The line filter has a turn ratio of "1" of a primary coil (not shown) and a secondary coil (not shown) such that loss of an output voltage with respect to the input voltage does not occur.

The bridge rectifier 920 half-wave rectifies the AC input voltage from the line filter 910 to convert the AC input voltage into a DC voltage, and applies the converted DC voltage to the smoother 930.

The smoother 930 smoothes the DC voltage having ripples and applies the smoothed DC voltage to the DC-DC converter 940.

The operation of the DC-DC converter 940 is started by applying the switching control signal q1 from the current controlling unit 950 to the control terminal of the switching element Q1 (FIG. 5). That is, the switching element Q1 is turned on or off based on the switching control signal q1. A pulse signal with a predetermined period is applied the inductor L1 in accordance with the turning on or off of the switching element Q1. The inductor L1 and the capacitor average and smooth the pulse signal to output a DC output voltage Vout applied to the lamp unit 960. Since the magnitude of the output voltage Vout is based on the period of the pulse signal from the switching element Q1, the magnitude of the output voltage Vout is defined by the turned-on and turned-off periods of the switching element Q1.

In detail, when the switching element Q1 is turned on, the input voltage Vin is applied through the turned-on switching element Q1, thereby an inductor current flowing through the inductor L1 is increased. At this time, the lamp unit 960 is supplied with a voltage charged in the capacitor C1. When the inductor current reaches the maximum value, a part of the inductor current flows into the capacitor, and thereby the capacitor C1 is charged, and another part of the inductor current flows into the lamp unit 960. When the switching element Q1 is turned off, the inductor current flows into the lamp unit 960, and thereby the inductor current is decreased.

As described above, a magnitude of the output voltage Vout is defined based on the variation of the inductor current varied in accordance with the switching state of the switching element Q1. The diode D1 prevents the inductor current from flowing in a reverse direction.

The current controlling unit 950 senses a voltage corresponding to the inductor current of the DC-DC converter 940, and adjusts a duty ratio of the switching control signal q1 based on the sensed voltage for controlling the DC-DC converter 940. The operation of the current controlling will be described in more detail below.

The lamp unit 960 is driven based on the backlight control signals CONT3 and the DC voltage from the power supply 970 to turn on or turn off the LEDs 961. By mixing the light of the red, green, and blue colors from the red, green, and blue LEDs, white color light is emitted from the lamp unit 960.

The light from the backlight assembly 900 passes through the LC layer 3 and experiences a change of its polarization. The change of the polarization is converted into that of the light transmittance by the polarizers.

By repeating this procedure by a unit of the horizontal period (which is denoted by "1H" and is equal to one period of the horizontal synchronization signal Hsync and the data enable signal DE), all gate lines G1-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion"). The inversion control signal RVS may also be controlled such that the polarity of the data voltages flowing in a data line in one frame are reversed (for example, line inversion and dot inversion), or the polarity of the data voltages in one packet are reversed (for example, column inversion and dot inversion).

Now, the operation of the current controlling unit 950 according to an embodiment of the present invention will be described in detail with reference to FIGS. 6 and 7.

Figure 6:
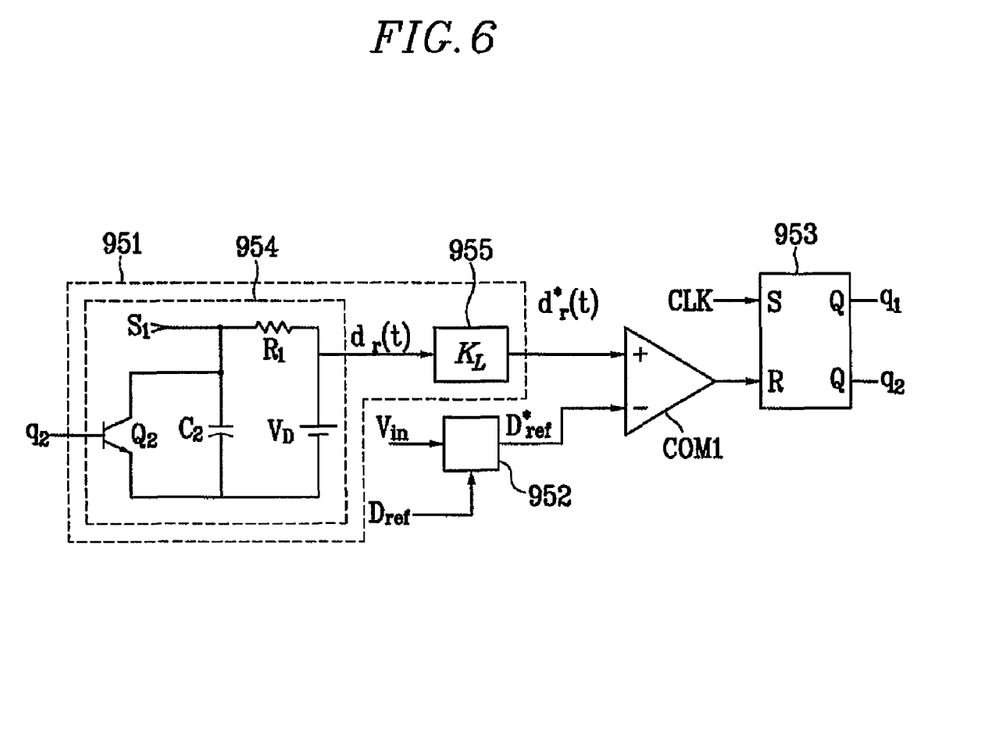
FIG. 6 is a circuit diagram of a current controlling unit according to an embodiment of the present invention.
Figure 7:
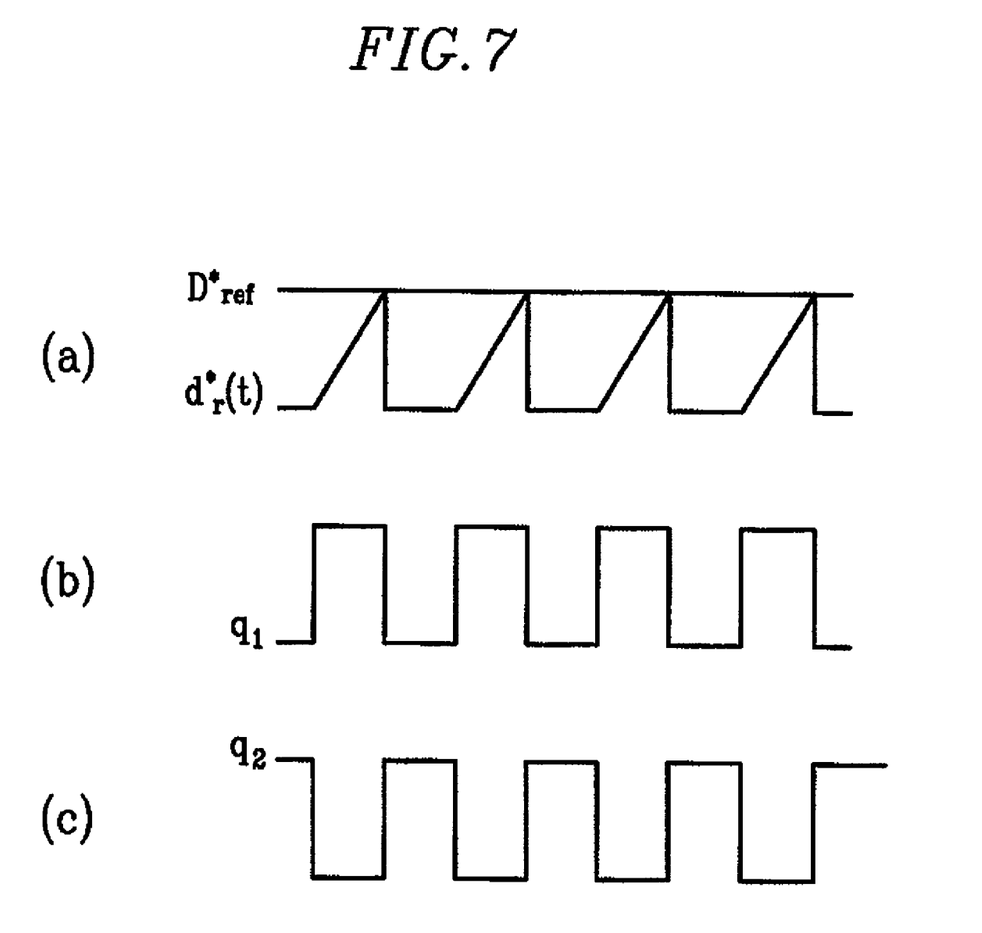
FIG. 7 illustrates waveforms of signals outputted from the current controlling unit.

FIG. 6 is a circuit diagram of a current controlling unit according to an embodiment of the present invention and FIG. 7 illustrates waveforms of signals outputted from the current controlling unit such as switching control signals q1 and q2, reference duty signal D*ref, and a signal d*r(t) from a linear unit 955.

As shown in FIG. 6, the current controlling unit 950 includes a duty signal feedback controlling unit 951, a duty signal adjusting unit 952, an operating amplifier COM1 connected to the duty signal feedback controlling unit 951 and the duty signal adjusting unit 952, and an RS flip flop 953 having a reset terminal connected to the operating amplifier COM1 and a set terminal connected to the external clock signal.

The duty signal feedback controlling unit 951 includes a current sensing unit 954 and a linear unit 955 connected to the current sensing unit 954.

The current sensing unit 954 includes a resistor R1 connected to the inductor L1 of the DC-DC converter 940 and the linear unit 955, a switching element Q2 having an input terminal connected to the inductor L1, an output terminal connected to a negative (−) terminal of a constant voltage Vd, a control terminal connected to an inverting output terminal −OUT (q2) of the RS flip flop 953, and a capacitor C2 connected between the input terminal and the output terminal of switching element Q2.

A signal q1 from a non-inverting output terminal OUT is applied to the switching element Q1 of the DC-DC converter 940.

The duty signal adjusting unit 952 is a divider supplied with the input voltage Vin of the DC-DC converter 940 and an external reference duty signal Dref.

The operating amplifier COM1 is a comparator comparing signals applied to a non-inverting input terminal (+) and an inverting input terminal (−) thereof, and outputting a signal with a corresponding level based on the result of the comparison.

Now, the operation of the current controlling unit 950 will be described in detail.

The switching control signals q1 and q2 applied to the control terminals of the switching elements Q1 and Q2 of the DC-DC converter 940 and the current controlling unit 950, respectively, are outputted from the non-inverting output terminal OUT and the inverting output terminal −OUT of the RS flip flop 953 and are inverse of each other.

The inductor current flowing through the inductor L1 is increased by the turning on of the switching element Q1 of the DC-DC converter 940 based on the switching control signal q1, and a voltage S1 corresponding to the inductor current is applied to the duty signal feedback controlling unit 951 of the current controlling unit 950.

At this time, since the switching element Q2 is turned off, the applied voltage S1 charges the capacitor C2 and the applied voltage S1 is also applied to the linear unit 955 through the resistor R1.

When the switching element Q1 is turned off by the switching control signal q1 of a low level and the switching element Q2 is turned on by the switching control signal q2 of a high level, a current corresponding to the voltage S1 from the DC-DC converter 940 flows through the turned-on switching element Q2.

Thus, while the switching element Q2 is turned off, the waveform of an output signal dr(t) outputted from the current sensing unit 954 is a ramp function shape with a time constant characteristic defined by the resistor R1 and the capacitor C2. When the switching element Q2 is turned on, the output signal dr(t) maintains an initial level. At this time, the output signal dr(t) with respect time is given by:

$$Dr(t) = q2 V_D (1 - e^{(-t/RC)}) \quad (1)$$

Here, q2 is "0" when the switching element Q2 is turned off, but is "1" when the switching element Q2 is turned on. The RC is a time constant defined by the resistor R1 and the capacitor C2.

That is, since the gradient of the output signal dr(t) from the current sensing unit 954 is varied based on the duty ratio of the switching control signal q2, and, as described above, the switching control signals q1 and q2 are inverted to each other, the output signal dr(t) functions as a feedback signal for feeding back the duty ratio of the switching control signal q1.

The signal dr(t) from the current sensing unit 954 is applied to the linear unit 955.

Since the signal dr(t) has the RC time constant characteristic, signal delay is occurred as the time constant. Thus, output time of the switching control signal q1 increases, and thereby reliability of a feedback control of the DC-DC converter 940 is decreased.

The linear unit 955 converts the signal dr(t) into a sawtooth signal d*r(t) of which the time constant characteristic is decreased (curve (a) in FIG. 7). That is, the linear unit 955 converts the signal dr(t) into the signal d*r(t) with a linear characteristic by using the linear function with a linear constant $K_L$, to apply the signal d*r(t) to the comparator COM1.

As a result, for turning on the switching element Q1, the inductor signal S1 is changed into the signal d*r(t) with a waveform as shown in curve (a) in FIG. 7.

The duty adjusting unit 952 is for observing the output voltage Vout with respect to the variation of the input voltage Vin. Thus, the duty adjusting unit 952 adjusts the reference duty signal Dref, which is defined based on the output voltage Vout, in accordance with the variation of the input voltage Vin of the DC-DC converter 940. That is, as given by Equation 2 below, the duty adjusting unit 952 divides the reference duty signal Dref by the input voltage Vin, to output a result reference duty signal D*ref to the comparator COM1. At this time, the reference duty signal Dref indicates the output voltage Vout with a desired magnitude for the DC-DC converter 940.

$$D^*ref = Dref/Vin \quad (2)$$

The comparator COM1 is supplied with the signal d*r(t) from the duty signal feedback controlling unit 951 through the non-inverting terminal (+) thereof and is supplied with the result reference duty signal D*ref from the duty signal adjusting unit 952 through the inverting terminal (−) thereof, to compare the signals d*r(t) and D*ref.

When the signal d*r(t) that gradually increases while the switching element Q2 is turned off reaches the result reference voltage D*ref, an output signal state from the comparator COM1 is changed from a low level into a high level, and when the signal d*r(t) decreases by the turning on of the switching element Q2 to be below the result reference voltage D*ref, an output signal state from the comparator COM1 is changed from a high level into a low level. Thus, when the signal d*r(t) reaches the result reference voltage D*ref, a pulse signal with a pulse width is applied to the reset terminal R of the RS flip flop 953.

In response to the pulse signal, the RS flip flop 953 changes a state of the switching control signal q1 outputted from the non-inverting output terminal OUT from a high level into a low level.

As a result, as shown in FIGS. 7B and 7C, a pulse width of the switching control signals q1 and q2 is defined by a time until the signal d*r(t) reaches the result reference voltage D*ref.

That is, by adjusting the voltage level of the reference signal Dref based on the variation of the input voltage Vin, the duty ratios of the switching control signals q1 and q2 are varied. A switching period of the switching element Q1 of the DC-DC converter is changed based on the duty ratio of the signal q1, to control the output voltage Vout outputted from the DC-DC converter 940 and applied to the lamp unit 960.

By adjusting the reference duty signal Dref based on the variation of the input signal Vin and sensing the variation of the inductor current in real-time so as to change the duty ratio of the switching control signal q1, the DC-DC converter 940 has a stable output voltage Vout regardless of the variation of the input voltage Vin and noises including harmonic wave components.

According to the present invention, the DC-DC converter has a stable output voltage regardless of the variation of the input voltage thereof and noises including harmonic wave components, and reliability of the DC-DC converter is improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A power supply comprising:
a DC-DC converter being supplied with an external DC input voltage and a first switching control signal for a first switching control unit and outputting a duty sensing signal of which a magnitude is varied in accordance with the first switching control signal, the duty sensing signal being indicative of a duty ratio of the first switching control signal, and the DC-DC converter converting the input voltage into a DC output voltage of a predetermined magnitude based on the first switching control signal;
a diode and an inductor directly connected to an output terminal of the first switching control unit having an input terminal directly connected to the external DC input in the DC-DC converter, wherein the diode prevents a current of the inductor from flowing in a reverse direction; and a feedback controlling unit comparing the duty sensing signal with a first reference signal to adjust the duty ratio of the first switching control signal.

2. The power supply of claim 1, wherein the feedback controlling unit comprises:
a current sensing unit changing the duty sensing signal into a sawtooth wave signal;
a duty signal adjusting unit supplied with the input voltage and a second reference signal, the duty signal adjusting unit adjusting the second reference signal based on the variation of the input voltage to generate an adjusted second reference signal as the first reference signal;
a comparator comparing the sawtooth wave signal with the first reference signal to output a pulse signal of an appropriate pulse width; and
a flip flop resetting a state of an output signal thereof, when the pulse signal is applied, the output signal of the flip flop operative to adjust the duty ratio of the first switching control signal.

3. The power supply of claim 2, wherein the sawtooth wave signal has an exponential function characteristic, and further comprises a linear unit decreasing the exponential function characteristic of the sawtooth wave signal to be a linear sawtooth wave signal.

4. The power supply of claim 3, wherein the current sensing unit comprises:
a switching element having a control terminal supplied with a second switching control signal, an input terminal supplied with the duty sensing signal from the DC-DC converter, and an output terminal connected to a constant voltage;
a resistor connected to the duty sensing signal and commonly connected to the linear unit and the constant voltage; and
a capacitor connected to the input terminal and the output terminal of the switching element.

5. The power supply of claim 4, wherein the first switching control signal is inverse of the second switching control signal.

6. The power supply of claim 2, wherein the duty signal adjusting unit is a divider.

7. The power supply of claim 2, wherein the flip flop is an RS flip flop of which a set terminal is connected to an external clock signal, a reset terminal is connected to the comparator, a non-inverting output terminal outputs the first switching control signal, and an inverting output terminal outputs the second switching control signal.

8. A display device including a plurality of pixels, a lamp unit emitting light to the pixels, and a power supply applying a driving voltage to the lamp unit, wherein the power supply comprises:
a DC-DC converter being supplied with an external DC input voltage and a first switching control signal for a first switching control unit and outputting a duty sensing signal of which a magnitude is varied in accordance with the first switching control signal, the duty sensing signal being indicative of a duty ratio of the first switching control signal, and the DC-DC converter converting the input voltage into a DC output voltage of a predetermined magnitude based on the first switching control signal;
a diode and an inductor directly connected to an output terminal of the first switching control unit having an input terminal directly connected to the external DC input in the DC-DC converter, wherein the diode prevents a current of the inductor from flowing in a reverse direction; and
a feedback controlling unit comparing the duty sensing signal with a first reference signal to adjust a duty ratio of the first switching control signal.

9. The device of claim 8, wherein the feedback controlling unit comprises:
a current sensing unit changing the duty sensing signal into a sawtooth wave signal;
a duty signal adjusting unit supplied with the input voltage and a second reference signal, the duty signal adjusting unit adjusting the second reference signal based on the variation of the input voltage to generate an adjusted second reference signal as the first reference signal;
a comparator comparing the sawtooth wave signal with the first reference signal to output a pulse signal of an appropriate pulse width; and
a duty ratio adjusting unit resetting a state of an output signal thereof when the pulse signal is applied, the output signal of the duty ratio adjusting unit operative to adjust the duty ratio of the first switching control signal.

10. The power supply of claim 9, wherein the sawtooth wave signal has an exponential function characteristic, and further comprises a linear unit decreasing the exponential function characteristic of the sawtooth wave signal to be a linear sawtooth wave signal.

11. The power supply of claim 10, wherein the current sensing unit comprises:
a switching element having a control terminal supplied with a second switching control signal, an input terminal supplied with the duty sensing signal from the DC-DC converter, and an output terminal connected to a constant voltage;
a resistor connected to the duty sensing signal and commonly connected to the linear unit and the constant voltage; and
a capacitor connected to the input terminal and the output terminal of the switching element.

12. The device of claim 11, wherein the first switching control signal is inverse of the second switching control signal.

13. The device of claim 9, wherein the duty ratio adjusting unit is an RS flip flop being supplied with an external clock signal and the pulse signal from the comparator and outputting the first switching control signal.

14. The device of claim 8, wherein the lamp unit comprises a light emitting diode.

15. A current controlling apparatus controlling a DC-DC converter which is supplied with an external DC input voltage and a first switching control signal and outputs a duty sensing signal of which a magnitude is varied in accordance with the first switching control signal, the duty sensing signal being indicative of a duty ratio of the first switching control signal, and the DC-DC converter converts the input voltage into a DC output voltage of a predetermined magnitude based on the first switching control signal, the apparatus comprising:
a current sensing unit changing the duty sensing signal into a sawtooth wave signal;
a duty signal adjusting unit supplied with the input voltage and a second reference signal, the duty signal adjusting unit adjusting the second reference signal based on the variation of the input voltage to generate an adjusted second reference signal as a first reference signal;
a comparator comparing the sawtooth wave signal with the first reference signal to output a pulse signal of an appropriate pulse width; and
a duty ratio adjusting unit resetting a state of an output signal thereof when the pulse signal is applied, the output signal of the duty ratio adjusting unit operative to adjust the duty ratio of the first switching control signal.

16. The apparatus of claim 15, wherein the sawtooth wave signal has an exponential function characteristic, and the apparatus further comprises a linear unit decreasing the exponential function characteristic of the sawtooth wave signal to be a linear sawtooth wave signal.

17. The apparatus of claim 15, wherein the current sensing unit comprises:
   a switching element having a control terminal supplied with a second switching control signal, an input terminal supplied with the duty sensing signal, and an output terminal connected to a constant voltage;
   a resistor connected to the duty sensing signal and commonly connected to the linear unit and the constant voltage; and
   a capacitor connected to the input terminal and the output terminal of the switching element.

18. The apparatus of claim 17, wherein the first switching control signal is inverse of the second switching control signal.

19. The apparatus of claim 15, wherein the duty ratio adjusting unit is an RS flip flop being supplied with an external clock signal and the pulse signal from the comparator and outputting the first switching control signal.

20. A light source driving apparatus comprising
   a lamp unit having at least one light source,
   a power supply applying a driving voltage to the light source, and
   a signal controlling unit applying a lamp control signal to the light source, wherein the power supply comprises:
   a signal converting unit converting an externally applied AC voltage into a DC voltage;
   a DC-DC converter being supplied with the DC voltage and a first switching control signal for a first switching control unit and outputting a duty sensing signal of which a magnitude is varied in accordance with a first switching control signal, the duty sensing signal being indicative of a duty ratio of the first switching control signal, and the DC-DC converter converting the input voltage into a DC output voltage of a predetermined magnitude based on the first switching control signal;
   a diode and an inductor directly connected to an output terminal of the first switching control unit having an input terminal directly connected to the external DC input in the DC-DC converter, wherein the diode prevents a current of the inductor from flowing in a reverse direction; and
   a feedback controlling unit comparing the duty sensing signal with a first reference signal to adjust the duty ratio of the first switching control signal.

21. The apparatus of claim 20, wherein the feedback controlling unit comprises:
   a current sensing unit changing the duty sensing signal into a sawtooth wave;
   a duty signal adjusting unit supplied with the input voltage and a second reference signal, the duty signal adjusting unit adjusting the second reference signal based on the variation of the input voltage to generate an adjusted second reference signal as the first reference signal;
   a comparator comparing the sawtooth wave signal with the first reference signal to output a pulse signal of an appropriate pulse width; and
   a duty ratio adjusting unit resetting a state of an output signal thereof when the pulse signal is applied, the output signal of the duty ratio adjusting unit adjusting the duty ratio of the first switching control signal.

22. The apparatus of claim 20, wherein the light source is a light emitting diode.

23. The apparatus of claim 21, wherein the duty ratio adjusting unit is an RS flip flop being supplied with an external clock signal and the pulse signal from the comparator and outputting the first switching control signal.

* * * * *